(No Model.) 2 Sheets—Sheet 1.

H. HARILD.
INSTRUMENT FOR ASCERTAINING THE VARIATION OF THE COMPASS.

No. 362,960. Patented May 17, 1887.

Witnesses
E. C. Wiedeman
W. B. Masson

Inventor
Hans Harild
by E. E. Masson
atty (No Model.) 2 Sheets—Sheet 2.
H. HARILD.
INSTRUMENT FOR ASCERTAINING THE VARIATION OF THE COMPASS.
No. 362,960. Patented May 17, 1887.
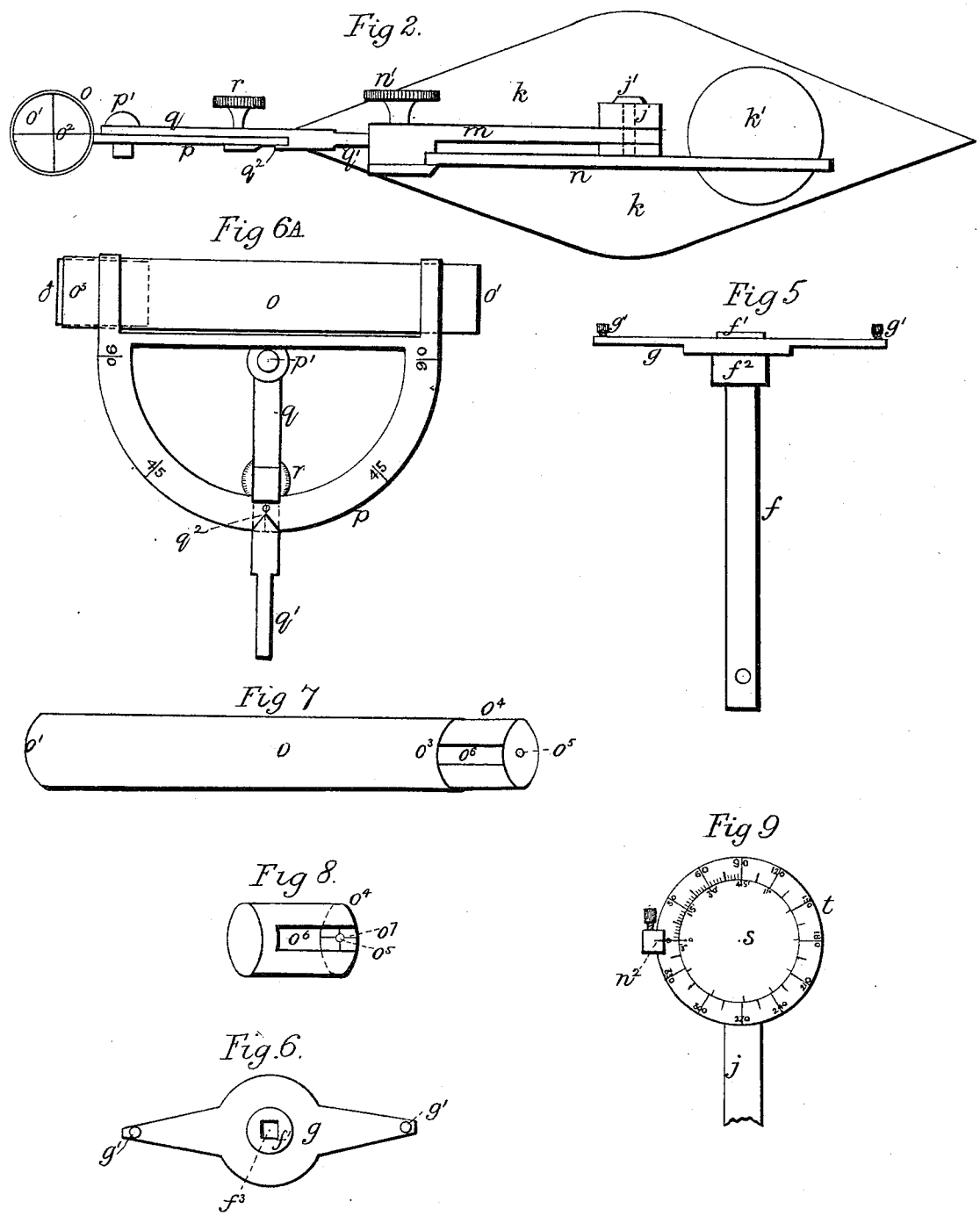
Witnesses.
E. F. Wurdeman
W. B. Masson
Inventor.
Hans Harild
by E. E. Masson
atty.

UNITED STATES PATENT OFFICE.

HANS HARILD, OF NORTH SHIELDS, COUNTY OF NORTHUMBERLAND, ENGLAND.

INSTRUMENT FOR ASCERTAINING THE VARIATION OF THE COMPASS.

SPECIFICATION forming part of Letters Patent No. 362,960, dated May 17, 1887.

Application filed May 24, 1886. Serial No. 203,072. (No model.) Patented in England October 22, 1884, No. 13,964.

*To all whom it may concern:*

Be it known that I, HANS HARILD, a subject of His Majesty the King of Denmark, residing at North Shields, in the county of Northumberland, England, have invented a new and useful Instrument for Ascertaining the Variation of the Compass, (for which I have obtained a patent in Great Britain, No. 13,964, bearing date October 22, 1884,) of which the following is a specification.

My invention relates to an improved instrument by means of which the true pole can be determined and the variation of the compass ascertained in any latitude without the aid of time.

Figure 1:
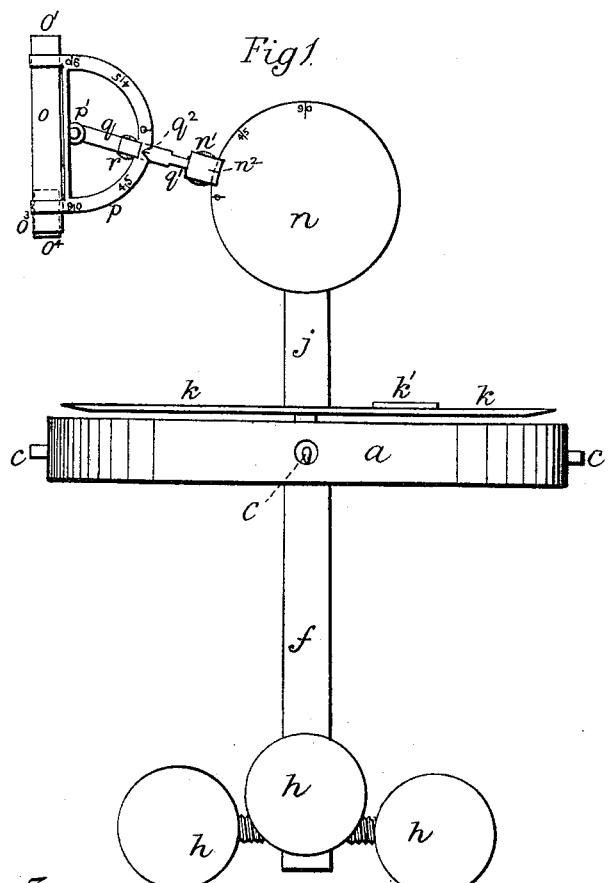
Figure 3:
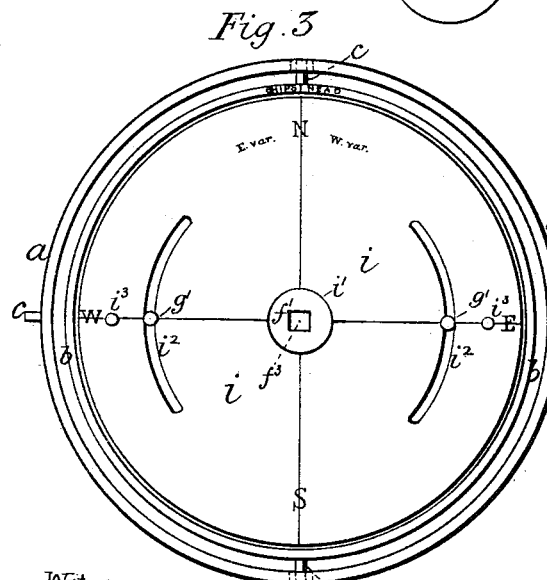
Figure 4:
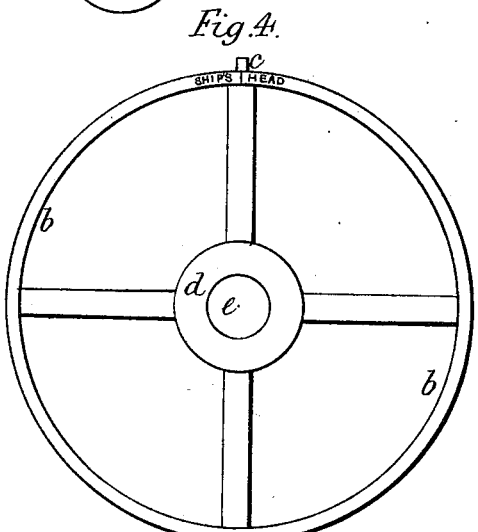

In the drawings, Figure 1 is an elevation of one of my improved instruments complete. Fig. 2 is a plan of my improved instrument without the compass-card, gimbals, and weighted adjusting-screws, on an enlarged scale, and with the arm $m$ at right angles to the standard $j$. Fig. 3 is a plan of the compass-card and gimbals. Fig. 4 is a plan of the inner gimbal. Fig. 5 is an elevation of the balance-rod and cross-head. Fig. 6 is a plan of the cross-head. Fig. $6^A$ shows the "sight-vane" on an enlarged scale. Figs. 7 and 8 are views of details of the sight-vane. Fig. 9 is an elevation of a portion of my improved instrument, showing a modified form thereof.

Like letters indicate like parts in all the figures.

My improved instrument (shown complete in Fig. 1) is carried by two gimbal-rings, $a\ b$, the axes $c$ of which are knife-edged. The inner gimbal-ring, $b$, (shown in plan in Fig. 4,) carries a central disk, $d$, having a circular socket, $e$, into which the balance-rod $f$ is slipped, the said rod being thus swung from the said gimbal-rings. The balance-rod $f$ has a cross-head, $g$, and above and below the said cross-head are bosses or enlargements $f'\ f^2$, the under side of the latter forming a shoulder on the balance-rod, which shoulder rests upon the disk $d$. The lower end of the balance-rod $f$ carries the weighted adjusting-screws $h$. The balance-rod, with its cross-head $g$, is shown in elevation in Fig. 5, and the cross-head in plan in Fig. 6. A compass-card, $i$, divided in the ordinary manner, (shown in Fig. 3,) is arranged within the gimbal-ring $b$ and adjustably secured upon the cross-head $g$. The said compass-card has a central hole, $i'$, which slips over the boss $f'$ of the balance-rod, and slots $i^2$, through which the set-screws $g'$ pass and clamp the compass-card to the cross-head in the desired position, buttons $i^3$ being provided on the said card to assist the adjustment thereof. The compass-card is also marked with east and west variations.

The lower end of the standard $j$ fits into the square socket $f^3$ in the boss $f'$ of the balance-rod $f$, and the said standard carries on its lower end the platform $k$, (of the form shown in Fig. 2,) on one end of which is a spirit-level, $k'$. When the standard $j$ is fitted into the balance-rod, the said platform is immediately over the compass card $i$. To the upper end of the standard $j$ is pivoted an arm or lever, $m$, the said arm or lever turning freely in a vertical plane upon its pin or pivot $j'$. A dial, $n$, divided into degrees from 0 to 90, as shown in Fig. 1, is secured perpendicularly to the standard $j$.

The outer end of the arm or lever $m$ is provided with a clamp and screw, $n'$, (shown clearly in Fig. 2,) whereby the said arm or lever can be clamped or secured to the said dial when set to the required position, the edge of the said dial fitting within the said clamp. The outer face of the clamp is marked with a line, $n^2$, indicating the center of the arm or lever $m$. This mark is opposite zero of the dial $n$ when the arm or lever $m$ is at right angles to the standard $j$.

The arm or lever $m$ carries the sight-vane, which consists of a tube, $o$, pivoted at one side to the end of a rod, $q$. A semicircular protractor or guide, $p$, extends from the same side of the tube, the pivot $p'$, which unites the rod $q$ and tube $o$, forming the center of the said protractor or guide, the said rod and protractor working in contact with each other. The other end, $q'$, of the said rod is fitted to a circular socket in the outer end of the arm or lever $m$. The protractor or guide $p$ is marked with a scale, the zero of which is at right angles to the tube $o$, and the scale extends on each side of the zero-mark to ninety degrees. The surface of the rod $q$, against which the protractor or guide $p$ works, is flattened, and the said rod has an index-point, $q^2$, and a clamp and clamping-screw, $r$. When the rod $q$ is at right angles to the tube $o$ the index-point $q^2$ is opposite the zero of the guide or protractor, and by means of the said guide or protractor and index-point the tube and guide can be set and clamped to the required angle. The tube $o$ is open at its upper end, $o'$, and in this end are inserted two wires crossing each other at right angles, as shown at $o^2$, Fig. 2.

Into the lower end, $o^3$, of the tube $o$ a short tube or eye-piece, $o^4$, slides telescopically. The outer end of this short tube or eye-piece $o^4$ is closed with the exception of a small central sight-hole, $o^5$. On the inner side of the end of this short tube or eye-piece are marked two lines crossing each other at right angles, as shown at $o^7$ in Fig. 8, these lines corresponding to the cross-wires at $o^2$, the sight-hole $o^5$ forming the center, where the lines cross each other, and the said tube has also a slot or aperture, $o^6$, cut or formed in its side. Fig. 7 is a perspective view of the tube $o$, with the tube $o^4$ partially withdrawn, and Fig. 8 is a perspective view of the tube $o^4$ withdrawn from the tube $o$. The degrees on the upper half of the protractor or guide $p$—that is to say, from zero to the end $o'$ of the tube $o$—are for declination contrary to latitude, those on the lower half of the protractor being for declination of the same name as the latitude. Instead of using the eye-piece $o^4$, the lower end, $o^3$, of the tube $o$ may be closed by a disk of some transparent material, the said disk having a central aperture, as at $o^5$, and having lines $o^7$ marked thereon, corresponding with the wires $o^2$, so that the reflection of the said wires upon the said disk can be seen from the exterior of the end $o^3$ of the tube $o$.

The operation of the instrument is as follows: In north latitude the arm or lever $m$ of the standard must point to the north pole; but in south latitude it must point to the south pole. If the magnetic course be required, the north of the compass-card $i$ is set to the variation—the number of degrees either to the right or the left of the point of the platform $k$, according as the variation is east or west—and the said compass-card is then fastened by the screws $g'$. The arm or lever $m$ is then set to the latitude, the end $q'$ of the rod $q$ of the sight-vane is inserted into its socket in the arm or lever $m$, and the tube $o$ inclined to the rod $q$ as many degrees as the declination of the object to be observed. When the declination is of the same name as the latitude, the lower end, $o^3$, is inclined toward the dial $n$; but when the declination is contrary to the latitude the end $o'$ must incline toward the dial. The compass-card is then adjusted to a horizontal level by means of the weighted screws $h$ and the spirit-level $k'$. The sight-vane is then brought to point directly to the object by which the observation is taken by the combined motions of turning the compass-card $i$, with standard $j$ and balance-rod $f$, upon its vertical axis in the socket $e$ and by turning the rod $q$ of the sight-vane in its socket in the arm or lever $m$. When the sight-vane thus points to the object, the mark "ship's head" on the gimbal-ring $b$ will show the magnetic course. If the compass card $i$ be not set to the variation, it will give the true course. If the observation be made by the sun, the short tube or eye-piece $o^4$ may be withdrawn a little from the tube $o$ and the shadow from the cross-wires at $o^2$ made to coincide with the cross $o^7$ marked on the inner side of the end of the eye-piece or short tube $o^4$, the shadow being seen through the slot $o^6$; but if the sun be not shining sufficiently to throw a shadow, or if a star or planet be observed, the eye must be applied to the aperture $o^5$ and the object brought in a line with the point at which the wires $o^2$ cross each other.

The instrument, as shown in Fig. 1, is set to about fifteen degrees of latitude and fifteen degrees of declination of the same name as the latitude.

The cross-wires $o^2$ and the corresponding cross on the inner side of the short tube or eye-piece $o^4$ may be varied by the substitution of any other suitable device for determining when the tubes point directly to the object to be observed by sighting the said object and by the shadow cast by the said device when the sun is shining brightly. In other words, to find the variation of the compass, after having set the instrument to latitude and declination, the compass-card $i$ having no needle, said card must be set to the true worth—that is, the south and north must be in a line with the platform $k$. Then turn the sight-vane and compass-card $i$, with standard and all attached, until the sight-vane points directly to the object observed, when the point of the compass-card $i$ at the ship's head will indicate the true course. The difference between this course and the course found by a compass directed by a magnet will be the variation of that compass.

The compass-card $i$ may be set to the variation as found from a chart by placing it the number of degrees either to the left or to the right of the points of the standard. In this case the difference between the ship's head by the instrument and that by a compass will be the deviation caused by the attraction of the iron in the ship.

My invention is based upon the supposition that a celestial object is observed from the center of the earth; and suppose the sun to have twenty degrees of north declination, then it would be in the zenith of every part of the twentieth degree of north latitude successively as the earth turns on its axis. Now, suppose my instrument was used at the center of the earth, we would have zero of latitude, to which the arm holding the sight-vane is placed—that is to say, the arm would be pointing either to the north or south pole. Supposing we point it to the north pole and ship the sight-vane into its place, with the tube inclined twenty degrees toward the north pole from the perpendicular of the arm, then by turning the rod to which the tube is fixed in the above arm we would have the tube pointing to every part of the twentieth degree of latitude, and consequently to the sun, as it stands over the said degree of latitude; but if the above arm were pointed either to the right or the left of the pole the sight-vane would also point to the right or to the left of the sun; hence we find the pole or course by bringing the sight-vane to bear upon the object. Now, as we use the sight-vane or instrument on the surface of the earth there will be a slight error in the instrument, caused by parallax—that is, the sun will have altered its bearing a little on account of the distance from the center of the earth to the surface. The greatest error is only nine seconds of an arc of a degree, whereas, regarding the stars, no error is perceptible, on account of their greater distance.

Instead of the dial $n$, I may use two dials, $s$ and $t$, as shown in Fig. 9. The annular dial $t$ is fixed to the front of the standard $j$, and the inner dial or "vernier," $s$, is fixed on the pivot of the arm or lever $m$, with which it turns within the annular dial $t$. The dial $t$ bears a scale dividing it into one hundred and twenty equal parts, each mark on the scale being equal to three degrees, or three hundred and sixty degrees for the entire scale or circumference of the dial. The zero, or 0, is in line with the mark $n^2$ on the clamp when the arm or lever $m$ is at right angles to the standard $j$. The inner dial or vernier, $s$, has a scale of sixty equal parts, extending around only $\frac{119}{120}$ (one-hundred-and-nineteen one-hundred-and-twentieths) of the circumference of the dial—that is to say, when the zero of the vernier is opposite the zero of the outer dial the sixtieth division on the vernier dial is opposite the one hundred and nineteenth division of the outer dial. Each mark on the vernier-dial indicates three minutes (3') of a degree. When these two dials are used the arm or lever $m$ is set to the latitude in the following manner: If it be required to set the said arm or lever to latitude 45° 30', it is raised until the zero of the vernier-dial $s$ (which turns with the said arm) is in line with the fifteenth division of the outer dial, $t$, which is forty-five degrees. The arm or lever $m$ is then still further raised until the mark "30'" on the vernier-dial $s$ coincides with the next mark above it on the dial $t$. The arm or lever $m$ will then be set to the required angle of 45° 30' when it is clamped by the screw $n'$, as previously described.

What I claim, and desire to secure by Letters Patent, is—

1. In an instrument for ascertaining the variation of the compass, the herein-described sight-vane, consisting of a tube, $o$, (with an eye-piece, $o^4$,) pivoted to a rod, $q$, and provided with a guide or protractor, $p$, by which the said tube can be set to any angle of declination, the said tube, or tube and eye-piece, being provided with cross-wires $o^2$, sight-hole $o^5$, and cross-mark $o^7$, in combination with the arm $q$, adjustably carried by the arm $m$ in standard $j$, substantially as herein set forth.

2. In an instrument for ascertaining the variation of the compass, the combination of the sight-vane, the arm or lever $m$, dial $n$, standard $j$, platform $k$, with spirit-level $k'$, balance-rod $f$, with cross-head $g$, and adjustable weights $h$, compass-card $i$, and gimbals $a$ and $b$, substantially as set forth.

3. In an instrument for ascertaining the variation of the compass, the combination of the arm or lever $m$, dials $n$, standard $j$, platform $k$, with spirit-level $k'$, and adjustable compass card $i$, substantially as set forth.

HANS HARILD. [L. S.]

Witnesses:
CHAS. H. BURKE,
W. A. LANG.